Oct. 7, 1930.  L. T. MEDHOLDT  1,777,412
WORKTABLE FOR WOODWORKING MACHINES OR THE LIKE
Filed Oct. 1, 1928
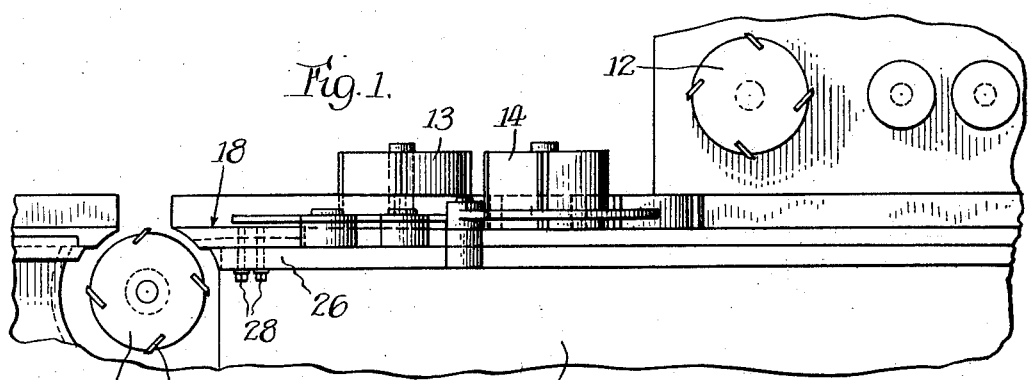
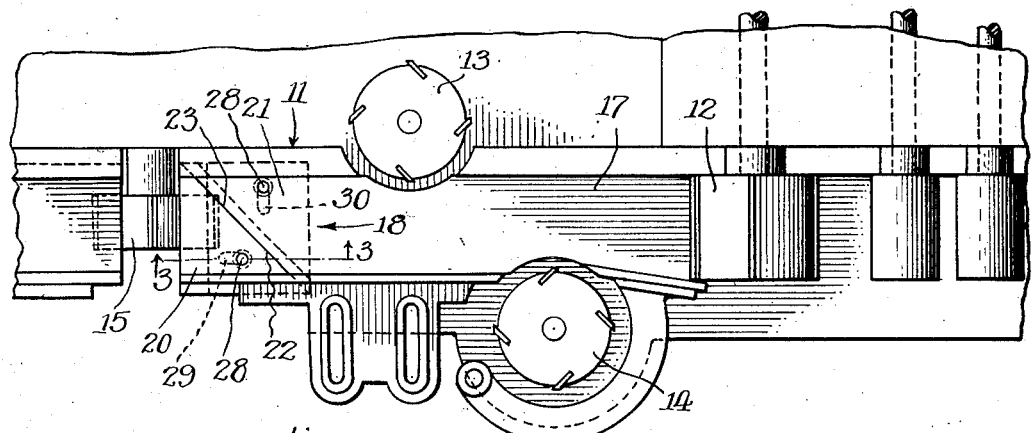
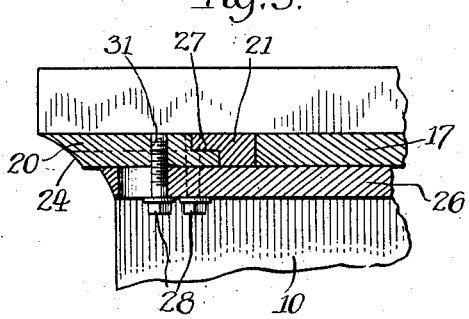
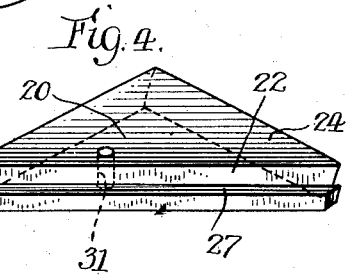
Inventor:
Louis T. Medholdt,
By Chindahl Parker Carlson
Attys.

Patented Oct. 7, 1930

1,777,412

UNITED STATES PATENT OFFICE

LOUIS T. MEDHOLDT, OF ROCKFORD, ILLINOIS, ASSIGNOR TO MATTISON MACHINE WORKS, OF ROCKFORD, ILLINOIS, A CORPORATION OF ILLINOIS

WORKABLE FOR WOODWORKING MACHINES OR THE LIKE

Application filed October 1, 1928. Serial No. 309,611.

The invention relates generally to work tables of the type usually used in molding machines, planers, matchers and the like to support the work as it is moved past the cutter.

Since cutter heads used in machines of this character vary in size according to the class of work which is being done, it is highly desirable that the work table be readily and easily adjustable to provide the proper clearance between the edges of the cutter knives and the adjacent edge of the work table.

For this purpose it has been the custom in the past to provide a work table having a portion near the bottom cutter arranged so as to be slidable longitudinally of the table toward and from the cutter. In its retracted position, such an adjustable portion usually provides an imperforate table surface but in the types heretofore used, the extension of the table has caused the formation of relatively large gaps between the movable and stationary portions of the table. Such gaps in the surface of the work table soon become filled with chips which scratch the surface of the work pieces and in some cases actually lift the work pieces from the table so as to change the dimensions of the finished work piece.

The primary object of the present invention is to provide a new and improved work table adapted for accurate adjustment toward and from the cutter head and providing at all times a substantially unbroken or imperforate surface over which the work pieces travel to the cutter.

Another object is to provide a new and improved work guiding means of this character adapted to permit accurate adjustment of the guiding means toward and away from the tool and arranged in all of its adjusted positions to provide a substantially unbroken surface along which work may be moved into operative relation with the tool.

Another object is to provide an adjustable work table for machines of this character which is simple in its design, economical to manufacture, readily adjustable, and extremely rugged in use.

Other objects and advantages will become apparent from the following description taken in connection with the accompanying drawings in which:

Figure 1 is a fragmentary front elevational view of a molding machine embodying the preferred form of the invention.

Fig. 2 is a fragmentary plan view of the machine shown in Fig. 1.

Fig. 3 is an enlarged vertical sectional view taken along the line 3—3 of Fig. 2.

Fig. 4 is an enlarged perspective view of a portion of the work table.

While the invention is susceptible of various modications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the form chosen for disclosure I have shown a molding machine embodying a base or bed 10 having a work table designated generally as 11 over which work pieces are moved into operative relation with the various cutters. An upper cutter head 12 is mounted adjacent the feeding-in end of the work table while side cutter heads 13 and 14 are mounted on opposite sides of the work table and a bottom cutter head 15 is mounted near the discharge end of the work table.

The bottom cutter 15 as herein shown has a plurality of cutter knives 16 mounted thereon and since these knives may at various times project different distances from the cutter arbor, it is desirable that the work table be arranged so that it may be easily and accurately adjusted toward and from the cutter 15 to provide the proper clearance therebetween and to provide a substantially unbroken or imperforate surface in all of its adjusted positions. To this end the work table in the form herein illustrated comprises a stationary portion 17 and an adjustable portion 18 intermediate the stationary portion and the cutter 15. In its preferred form the adjustable portion 18 of the table is supported directly upon the bed 10 and is arranged so that its forward edge may be moved toward and from the cutter without leaving a gap in the surface of the work table over which the work pieces move to reach the cutter 15.

In the form herein shown, the adjustable portion 18 of the table comprises a pair of plates 20 and 21 having complementary side edges 22 and 23 adapted to be placed in abutting relation to provide a substantially unbroken table surface. In the present embodiment the plate 21 is formed separately from the portion 17 so as to increase the range of adjustment of the device, but forms in effect a continuation of the surface of said portion 17. The plate 20 which is shown in detail in Fig. 4 has a forward edge 24 arcuately recessed along its lower corner to conform to the periphery of the cutter 15. The complementary edges 22 and 23 of the two plates are disposed at an angle at the forward edge 24 of the plate 20 so that when the table is adjusted toward and from the cutter, the plate 21 may be moved transversely thereof to maintain the two complementary edges 22 and 23 of the two plates in abutting relation.

In the present instance the plates 20 and 21 are supported by and are clamped to a cross-web 26 of the base 10 and to facilitate the clamping of the plates, they are made of slightly different thicknesses, the plate 21 being the thinner of the two and arranged to rest on a lateral extension 27 of the plate 20. Means is provided for clamping the plates in adjusted position and this means preferably comprises a pair of bolts 28 extending through suitable apertures 29 and 30 in the cross-web 26 and engaging threaded bores 31 in the two plates.

As herein shown, the two bolts 28 are spaced transversely of the table and since the plate 21 is of slightly less thickness than the plate 20, the bolt 28 which engages the plate 21 serves to clamp the extension 27 of the plate 20 against the web 26. Thus this particular arrangement of the plates also serves definitely to clamp the forward edge 24 of the plate 20 firmly in the desired position since this plate is held down against the web 26 by both of the bolts 28.

The aperture 29 in the web portion through which the bolt 28 passes to engage the plate 21 is preferably elongated in a direction transversely of the table so as to permit movement of the plate 21 in a transverse direction only. The aperture 30 through which the other bolt 28 passes is preferably elongated longitudinally of the table so as to govern the movement of the plate 20. When the plate 21 is moved transversely of the table it acts as a wedge to move the plate 20 longitudinally of the table toward the cutter.

From the foregoing description it will be apparent that the invention provides a novel work table which may be quickly and easily adjusted toward and from the cutter without forming a gap in the surface over which the work pieces are moved to the cutter.

I claim as my invention:

1. In a wood working machine or the like having a rotatable cutter, a work table having, in combination, a stationary portion providing a surface along which a work piece may be moved toward the cutter, and an adjustable portion forming a continuation of the surface provided by said stationary portion and arranged for adjustment toward and from the periphery of the cutter, said adjustable portion comprising two sections, one of which has a forward edge adjacent said cutter and a side edge extending at an angle from the forward edge thereof, and the other of which has a complementary angular side edge along which the angular side edge of said first mentioned plate may be moved in continually abutting relation to vary the relation of said forward edge to said cutter.

2. An adjustable work table comprising, in combination, a frame, a pair of plates shiftable on said frame, one of said plates having a forward edge adjustable to vary the length of the table, a pair of bolts one engaging each of said plates and each bolt engaging the frame for clamping its plate in position thereon, and an extension on the plate having said forward edge arranged to project between said frame and the other of said plates so as to be clamped therebetween when said bolts are tightened.

3. In a wood working machine or the like having a rotatable cutter, a table along which work pieces may be moved to said cutter comprising, in combination, a stationary portion, and a movable end portion adapted for adjustment toward and from the periphery of said cutter, and means operable to adjust said movable end portion including a wedge shaped member movable transversely of said table and arranged to provide a substantially unbroken surface between said stationary portion and said movable end portion.

4. In a wood working machine or the like having a rotatable cutter, the combination of a work supporting table having a stationary portion and a movable portion interposed between the cutter and said stationary portion, said movable portion comprising a pair of plates having complementary side edges disposed at an angle to the axis of said cutter, and means for supporting and guiding said plates for movement at right angles to each other with said edges continually in abutting relation.

5. In a machine of the class described having a rotatable cutter, a work table having, in combination, a stationary top portion, and a movable top portion comprising a plurality of shiftable plates having complementary abutting side edges disposed at an acute angle to the axis of said cutter, said two portions cooperating to form a continuous surface along which a work piece may be moved into or out of operative relation with respect to the cutter.

6. In a machine of the class described having a rotatable cutter and a stationary work table providing a surface over which work pieces may be moved toward said cutter, the combination of means forming an imperforate continuation of the surface of said stationary work table to a point adjacent said cutter, said means including a movably mounted plate having a side edge disposed at an angle to the axis of said cutter.

7. A work table adapted for use in a wood working machine or the like having a rotatable cutter, said work table comprising, in combination, a stationary top portion and a movable top portion cooperating to form a continuous surface along which a work piece may be moved into or out of operative relation with the cutter, said movable portion being adjustable relatively to said stationary top portion toward and away from the cutter, said movable top portion being arranged to provide an imperforate surface between said stationary top portion and said cutter in any adjusted position thereof.

8. A work table adapted for use in a wood working machine or the like having a rotatable cutter, said work table comprising, in combination, a stationary portion and an adjustable plate disposed along the path over which work pieces are moved to the cutter, said adjustable plate providing an edge adjustable toward and from a cutter, said plate being arranged to provide an imperforate continuation of the top of said stationary portion in any of its adjusted positions.

9. A work table for wood working machines providing a longitudinal path over which work pieces may be moved to a tool, said table including two top portions supported for movement relatively to each other, said portions having abutting side edges disposed at an angle to the length of said path whereby to permit adjustment of the length of said table along said path by relative movement of one of said portions transversely of said path and to provide a substantially imperforate table top in any of the adjusted positions.

10. In a machine of the class described having a processing tool, the combination of means providing a guiding surface extending longitudinally of the path along which a work piece is moved in the performance of a processing operation by the tool, said means including two portions each forming a part of said guiding surface and the two portions being supported for movement relatively to each other, said portions having abutting side edges extending from said guiding surface and disposed at an angle to the length of said path whereby to permit of adjustment of the length of said table along said path by relative movement of one of said portions transversely of said path and to provide a smooth and substantially imperviate guiding surface in any of the adjusted positions.

In testimony whereof, I have hereunto affixed my signature.

LOUIS T. MEDHOLDT.